Patented Feb. 17, 1925.

1,526,714

UNITED STATES PATENT OFFICE.

JOSEPH O. LUTHY, OF SAN ANTONIO, TEXAS, ASSIGNOR TO LUTHY BATTERY EQUIPMENT COMPANY, A CORPORATION OF TEXAS.

RECOVERY AND UTILIZATION OF MATERIALS OF OLD SECONDARY BATTERY PLATES.

No Drawing.     Application filed February 28, 1924. Serial No. 695,801.

*To all whom it may concern:*

Be it known that I, JOSEPH O. LUTHY, a citizen of the Republic of Switzerland, residing at and whose post-office address is 120 Essex Street, in the city of San Antonio, county of Bexar, and State of Texas, have invented certain new and useful Improvements in Recovery and Utilization of Materials of Old Secondary Battery Plates; and I do hereby declare the following to be a full, clear, and exact description of the invention, such as will enable others skilled in the art to which it appertains to make and use the same.

The invention relates particularly to the recovery and utilization of the material of old secondary battery plates by a series of operations involving a minimum of labor and expense, and insuring a maximum recovery of the metal of the grids, and of the filling material for subsequent use, the metal to be used, if desired, for casting new grids, and the filling material to be employed, after proper treatment, as hereinafter described, in making up new plates.

It is a well known fact that the plates of secondary batteries, after continuous use, become so impaired, either structurally, or in respect to the condition of the filling material as to render them unavailable for further use in the batteries and such impaired plates therefore have to be scrapped, and as much as possible of the material constituting the elements thereof recovered, usually by well known smelting processes to recover the lead. In some instances attempts have been made to revivify impaired plates by chemical treatment, but all such methods have, as a rule, proven to be only temporary expedients, involving considerable trouble and expense and producing only a limited extension of the lives of the plates. The alternative modes of recovery of the metal constituents as by smelting or heat treatment necessarily results in a relatively large loss of the lead which constitutes the grid as well as the basis of the filling material.

The method involved in the instant invention is effective in that it results in a practically complete recovery of the metal of the grids, and the separation of the filling material in proper condition for practically immediate reuse in making up new plates, which are capable of being reformed or charged in a much shorter time than plates made up with fresh or original filling material.

The initial operation in treating the old plates is to subject them in mass, to percussive and attritive forces or actions, such as would be produced, for instance, in a ball mill, and for the purpose of breaking loose and completely separating the filling material from the structure of the grid without, however, breaking up or comminuting the grid structure due to the soft or plastic character of the metallic lead constituting the grids but, on the contrary, the metal of the grids will be completely separated from the filling material and, when the latter has been removed, will be in excellent condition for melting and recasting into new grids or, if desired, to be employed for any other purposes for which it is adapted. After, or during the physical separation of the filling material from the grid structure, the former is removed, by means of screening devices associated with the apparatus effecting the percussive and attritive separation, such for example as the well known type of ball mill, provided with screening elements in its structure, to discharge the comminuted material, or, in the alternative, the physical separation of the filling material from the grids may be first effected and then the filling material removed by screening the resultant mass, both methods resulting in the recovery of substantially all of the filling material in more or less comminuted form and of the complete lead content of the grids, thoroughly cleaned and ready for subsequent use.

The filling material substantially free from all metallic lead is then preferably ground or pulverized and screened to remove any undesirable foreign material, and is then ready to be made up into paste-like form for reapplication to other grids in the same manner as new or original filling material. So far as known it has been found impossible to use the filling material from old or discarded plates in making up new plates, because of the fact that no practical mode of imparting the necessary degree of physical stability or coherence to a paste made of the recovered filling material has been available. Numerous attempts have been made to use such recovered filling material by forming the same into a paste with various elements but, as indicated, these attempts, up to the present time, have been futile and of no avail, as the plates made therefrom have invariably broken down by reason of the rapid disintegration of the filling mass as soon as it is attempted to charge the plates. The present invention completely overcomes this difficulty and permits the use of the filling material in making up new plates, without material loss of the filling material obtained from the old plates. This result is accomplished by making up recovered filling material in the form of paste of substantially the same consistency as an original filling mass made of fresh materials, by incorporating with the recovered filling material a relatively weak aqueous solution of a fatty acid, preferably acetic acid. The proportions of the acid employed in the solution may vary within relatively wide ranges, say from 1 part of acid to 40 parts of water, to 1 part of acid to 250 parts of water by volume, the relative proportions which have been found most efficient being 1 part of acid to 200 parts of water or a solution of .5% of acid. The latter proportions are found to be particularly effective as the acid content is not sufficient to impair the metallic lead structure of the grid, but nevertheless is sufficient to produce with the comminuted filling material, a most effective, hard, porous, self sustaining, cementitious mass that will set up in a comparatively short time, and that will adhere to the grid structure with greater tenacity than paste made up of fresh filling material in the usual manner. The plates may be fabricated in any of the usual types of apparatus constructed for this purpose, and after the preliminary operation of filling the grids with the active material has been effected the plates are dried, and because of the peculiar action of the binding medium employed in the paste, the drying action may be forced or accelerated without danger of cracking the filling material from the grids, or in any way impairing the plate structure. In fact it has been found that plates made up as described may be completely dried and cured within a few hours, so that they are available for the final charging operations in a much shorter time than is possible of realization with plates made according to the prevailing methods.

It has also been found that plates made according to the present method are capable of being initially charged in a much shorter time than plates made of the original material, so that a material saving is effected in this respect. In carrying out the method it is not necessary to separate the old positive and negative plates in the operation of recovering the lead of the grids and the filling material individually, as the resultant mass of recovered filling material both positive and negative, may be employed in making up the filling mass for new plates, the only disadvantage attendant upon this mode of procedure being that a somewhat longer time is required for forming or charging the plates preparatory to utilizing them as power units. However as a usual and preferred procedure, the old positive and negative plates will be treated separately so that the recovered filling materials will preserve their individual characters and may be used either separately or in proper admixture in making up new plates. For example it has been found that in making positive plates from the recovered filling material, according to the present method, 70% of positive material admixed with 30% of negative material, formed into paste with the binder aforesaid, will produce most excellent results. However in making up negative plates not over 5% of the recovered positive material should be employed for the best results. As indicated, however, any proportions of the recovered positive and negative filling materials may be employed with good results, the relative proportions of the two characters of filling materials affecting only the time or rate of reforming or recharging the respective types of plates.

What I claim is:

1. The method of utilizing old secondary battery plate materials, which comprises separating the filling material from the grids, pulverizing the filling material, forming the same into a paste with an aqueous solution of a binding medium, and applying the paste to grids.

2. The method of utilizing old secondary battery plate materials, which comprises separating the filling material from the grids, pulverizing the filling material, forming the same into a paste with a binding medium that will cause the paste to set up into a relatively hard self-supporting cementitious mass, and applying the paste to grids.

3. The method of utilizing old secondary battery plate materials, which comprises separating the filling material from the grids, pulverizing the filling material, forming the same into a paste with acetic acid, and applying the paste to grids.

4. The method of utilizing old secondary battery plate materials, which comprises separating the filling material from the grids, pulverizing the filling material, forming the same into a paste with a weak solution of acetic acid, and applying the paste to grids.

5. The method of utilizing old secondary battery plate materials, which comprises separating the filling material from the grids, pulverizing the filling material, forming the same into a paste with a solution of not more than 2.5% of acetic acid, and applying the paste to grids.

6. The method of utilizing old secondary battery plate materials, which comprises subjecting the plates to percussive action to separate the filling material from the grids, forming the separated filling material into a paste by the addition of a binding medium that will cause the paste to set up into a relatively hard self supporting cementitious mass, and applying the paste to new grids.

7. The method of utilizing old secondary battery plate materials, which comprises subjecting the plates to percussive action to separate the filling material from the grids, forming the separated filling material into a paste, by the addition of a weak solution of acetic acid, and applying the paste to new grids.

8. The method of utilizing old secondary battery plate materials, which comprises subjecting the plates to percussive and attritive forces to free the filling material from the grid, forming the freed filling material into a paste with a weak solution of acetic acid, and applying the paste to new grids.

9. The method of treating old secondary battery plates, which comprises subjecting the plates to percussive force of a character to break away the filling mass without comminuting the grids, and separating the freed filling material from the metal of the grids.

10. The method of treating old secondary battery plates, which comprises subjecting the plates to percussive force of a character to break away the filling mass without comminuting the grids, separating the freed filling material from the metal of the grids, and grinding and screening the filling material.

11. The method of utilizing the filling material of old secondary battery plates, which comprises pulverizing the material, forming the same into a paste by the addition of a binding medium that will cause the paste to set up into a relatively hard self supporting cementitious mass, and applying the paste to supporting grids.

12. The method of utilizing the filling material of old secondary battery plates, which comprises pulverizing the material, forming the same into a paste by the addition of an aqueous solution of acetic acid, and applying the paste to the grids.

13. The method of utilizing the filling material of old secondary battery plates, which comprises pulverizing the material, forming the same into a paste by the addition of an aqueous solution of not less than .4% of acetic acid, and applying the paste to the grids.

In testimony whereof I affix my signature.

JOSEPH O. LUTHY.